Figure 1:
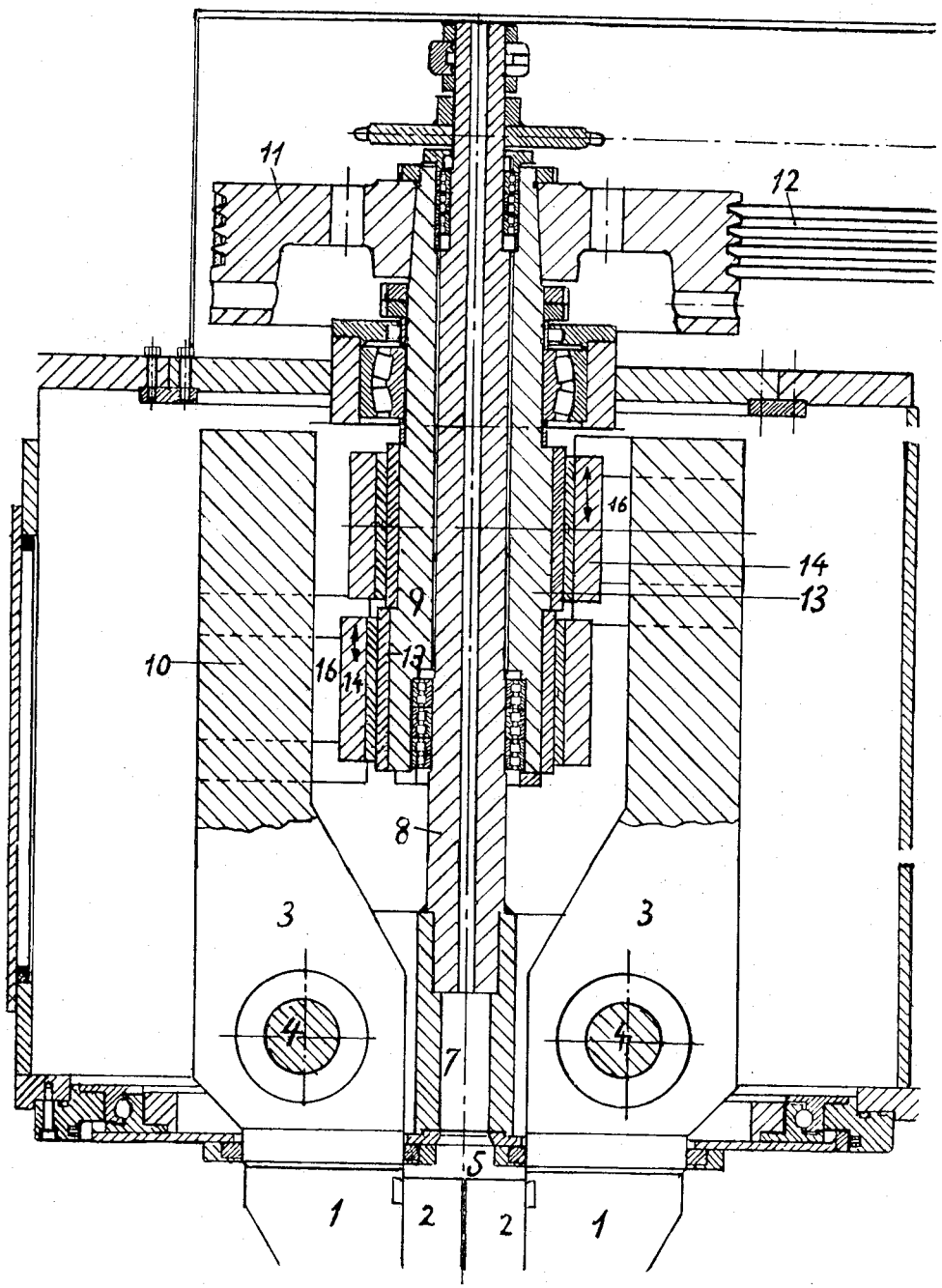

United States Patent [19]
Ribback

[11] 3,798,945
[45] Mar. 26, 1974

[54] MACHINE TOOL FOR SHAPING ARTICLES

[76] Inventor: Erich Ribback, 55 Trier, Maximiner Acht, Germany

[22] Filed: July 19, 1972

[21] Appl. No.: 273,243

[30] Foreign Application Priority Data
July 20, 1971 Germany.............................. 2136097

[52] U.S. Cl....................................... 72/76, 72/452
[51] Int. Cl............................................... B21j 7/10
[58] Field of Search....................... 72/76, 452, 402

[56] References Cited
UNITED STATES PATENTS

| 483,091 | 9/1892 | Yarington | 72/76 |
| 1,819,376 | 8/1931 | Muller | 72/76 |
| 1,955,535 | 4/1934 | Conner et al. | 72/76 |
| 3,277,690 | 10/1966 | Kraujalis | 72/452 |
| 3,654,789 | 4/1972 | Brauer | 72/76 |
| 3,668,915 | 6/1972 | Ribback | 72/76 |

Primary Examiner—Richard J. Herbst
Attorney, Agent, or Firm—Allison C. Collard

[57] ABSTRACT

A machine tool for shaping articles comprising a plurality of oppositely moving pressing tools mounted on dual arm levers driven by offset driving means. Oscillating cross-wise disposed joints are mounted on the offset driving means adjacent each other. The offset driving means are mounted on a hollow rotatable shaft which is disposed on a drive shaft, so that said cross-wise disposed joints are axially displaceable independently of each other. The joints are mounted at one end to the lever arms so as to provide a relatively long operating stroke for forming the articles.

3 Claims, 2 Drawing Figures

MACHINE TOOL FOR SHAPING ARTICLES

The present invention relates to tool machines for molding articles to a predetermined shape.

In conventional tool machines, the articles fabricated thereby are frequently weak due to the short operating stroke of the lever arms which form the article.

Accordingly, the present invention provides a tool machine for molding articles which comprises a plurality of oppositely moving press tools mounted on dual arm levers disposed about a longitudinal axis. Th lever arms are driven by offset driving means mounted on a rotatable hollow shaft on a drive shaft which rotates the lever arms. Oscillating crosswise disposed joints are mounted on the offset driving means, and are axially displaceable independently of each other with respect to the lever arms.

It is therefore an object of the present invention to provide a tool machine which shapes articles having a greater strength than those formed by conventional machines.

It is also an object of the present invention to provide a tool machine in which the oeprating stroke of the lever arms is longer than in conventional machines.

It is still a further object of the present invention to provide a tool machine which is simple in design, easy to manufacture, and efficient and reliable in operation.

Other objects and features of the present invention will become apparent from the following detailed description taken in connection with the accompanying drawings which disclose an embodiment of the invention. It is to be understood, however, that the drawings are designed for the purposes of illustration only, and are not intended as a definition of the limits and scope of the invention.

Figure 2:
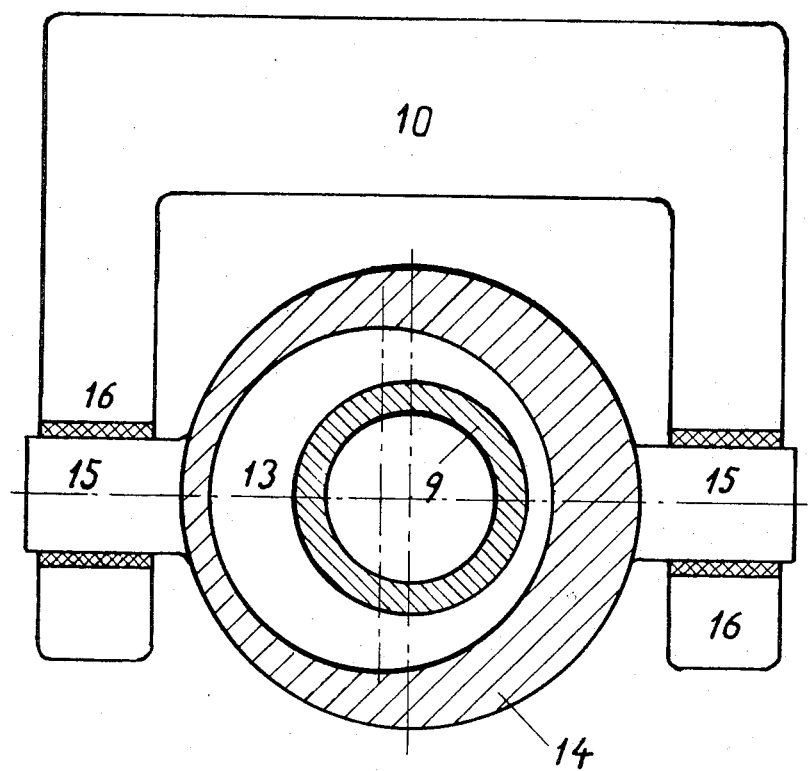

In the drawings, wherein similar reference numerals denote similar elements throughout the several views:

FIG. 1 is a cross-sectional side view of a tool machine constructed in accordance with the present invention; and FIG. 2 is a cross-sectional front view of the oscillating joints, offset driving means, and lever of the tool machine, showing the connection pin disposed between the lever arm and the offset driving means.

Referring to the drawings, there is shown a tool machine constructed in accordance with the present invention. Molding of articles by the machine is carried out by hammering. forging, pressing, or other similar type operations. Pivotable, dual arm levers are provided with a plurality of working tools 2 on short lever arms 1. Tools 2 carry out the operating strokes necessary to mold the article. The dual arm levers are driven by long lever arms 3, and are mounted so as to pivot about axis 4. The levers comprising lever arms 1 and 3 are disposed on the machine parallel to the longitudinal axis 5. The levers are mounted on one end 7 of a hollow drive shaft 8, which moves pivot axis 4 and the levers. As described above, the pivotable levers are rotatably mounted about shaping axis 5 with tools 2. A hollow shaft 9 is rotatably mounted on drive shaft 8, and is driven by the belt-pulley system 11-12.

Oscillating crosswise disposed joints are mounted on adjacent offset drive means 13 which are disposed on shaft 9 and secured to lever arms 3 at ends 10.

A rotatable, and axially displaceable, bushing 14 is disposed on each offset drive means 13. Connecting pins 15 pivotably couple bushing 14 to forked members 16 which extend from lever end 10. Thus, the oscillating crosswise disposed joint may be moved to all sides between lever end 10 and offset means 13. The apparatus of the present invention permits the obtaining of working strokes having lengths considerably longer than those of conventional machines.

While only a single embodiment of the present invention has been shown and described, it will be obvious to those persons of ordinary skill in the art that many changes and modifications may be made thereunto without departing from the spirit and scope of the invention.

What is claimed is:

1. In a machine tool for shaping articles and employing a plurality of oppositely moving tools each mounted on one arm of a dual arm lever and operated by offset drive means, the improvement comprising: each driven lever arm being connected to a separate offset drive means mounted on a common drive shaft through a separate cross-wise disposed joint means employing a pivotal connection to an axially displaceable member of said offset drive means, and the pivot axis of said pivotal connection being oriented radially to said shaft.

2. A machine tool as recited in claim 1, wherein said offset drive means comprises a rotatable eccentric journal located within an axially displaceable bushing on which are mounted pivot pins for said pivotal connection.

3. A machine tool as recited in claim 2, wherein said bushing is of eccentric configuration.

* * * * *